United States Patent Office 2,899,624
Patented Aug. 11, 1959

2,899,624

RATE FINDER FOR BATTERY CHARGER

William L. Marriott, Kalamazoo, Mich., assignor to Allen Electric and Equipment Company, Kalamazoo, Mich., a corporation of Michigan Application February 25, 1957, Serial No. 641,885

5 Claims. (Cl. 320—48)

This invention relates to a battery charger and particularly to a type thereof provided with means by which the voltage at which a charging operation is carried out may be readily varied to adjust it correctly to the capacity of the battery for receiving a charge.

It has long been recognized that the charging voltage at which a storage battery, or accumulator, is charged should be adjusted in accordance with the capacity of a battery for receiving such charge. If the charging voltage is too low, the battery will fail to receive the proper full charge regardless of how long the charging operation is continued, but if the charging voltage is too high, then the chemical change within the battery which is normally brought about by charging is carried too far and the battery may be damaged. This is fully recognized by the prior art and, among other places, is adequately described in a publication entitled, "The Battery Side of Voltage Regulation" published by the Delco-Remy Division of General Motors Corporation and bearing date of May 21, 1952, and in "Battery Service Manual," published by the Association of American Battery Manufacturers, 1953.

To accomplish this regulation, it has in the past been common to apply an ammeter at the output of a battery charger in order to measure the battery condition and then to regulate the charging conditions by suitable adjustments within the charging unit so that the charger output would be brought and held within known and proper limits.

This works well enough when carried out by skilled and conscientious workmen, but, in a constant effort to improve apparatus of this general type, it is desired to provide means by which such regulation can be obtained more easily and readily than is possible with equipment of the prior art, whereby to effect the application of such regulation in a larger number of cases than is now done where the operator uses prior art equipment. Therefore, if equipment could be designed embodying into a single unit a substantially conventional batttery charger together with means for effecting the indication of charging rate previously obtained only by utilizing an ammeter solely at the output of the battery charger, it would render the desired control over the battery charging rate sufficiently easier than has previously existed that such control would be more often exercised and correct charging rates more often utilized in the average commercial establishment than is presently the case.

Accordingly, the objects of the invention are:

(1) To provide in a single unit a battery charger having adjustable charging rates together with devices for establishing a correct and safe charging rate for a chargeable battery in a given condition.

(2) To provide equipment, as aforesaid, in which an indicator will show the difference in voltage supplied by the battery charger and the battery counter-voltage by which the battery is resisting the charger voltage.

(3) To provide equipment, as aforesaid, having sufficient flexibility to make other and further tests on a battery and for controlling the rate of charging in accordance with results of such tests.

(4) To provide equipment, as aforesaid, which will be of sufficient structural simplicity that its cost will not be materially greater than the usual cost of the battery charger alone.

(5) To provide equipment, as aforesaid, which will be easy to operate.

(6) To provide equipment, as aforesaid, whose operation will be equally as accurate as was previously normally obtained by the use of separate and conventionally applied instruments.

(7) To provide equipment, as aforesaid, which will be sturdy, capable of the relatively harsh use normally met with in garage and service station operations and which will continue to operate accurately and reliably throughout a long period of use.

Other objects and purposes of the invention will be apparent to persons acquainted with equipment of this general type upon a reading of the following disclosure and inspection of the accompanying drawings.

*General description*

In general, the invention contemplates the connection of a meter across the output terminals of a battery charger, which meter registers the differential in voltage applied between said terminals by algebraic summation of the battery charger voltage and the battery countervoltage. Ganged switches disconnect the primary winding of the charger transformer simultaneously with connecting the meter circuit across the output terminals of the charger and vice versa. A normally open, manually closable switch shunts the one of the ganged switches which is in the circuit of the primary winding of the transformer and can be actuated for momentarily energizing said transformer while the meter circuit is connected across the output terminals of the charger. A series of manually selectable taps on the primary winding of the charger transformer is provided in the usual manner for determining the charging rate. Thus, when the ganged switches connect the meter in voltage measuring position, the manual switch may be momentarily depressed to apply a charging potential to the output terminals of the charger and thereby measure by said meter the net voltage applied between said terminals by the charger and by the battery. The charging rate may then be adjusted to bring same to the desired value. The parts are integrated together for maximum simplicity of construction together with maximum ease of operation for the purposes intended and a wide flexibility for performing a plurality of desired tests and charging operations on a battery.

*Detailed description*

For purposes of convenient reference herein, the terms "rate finding" or "rate finder" will refer to the process, and the apparatus for performing the process, respectively, of comparing the output voltage of the charger with the back voltage of a given battery and utilizing the result of such comparison for determining the proper charging rate.

Figure 2:
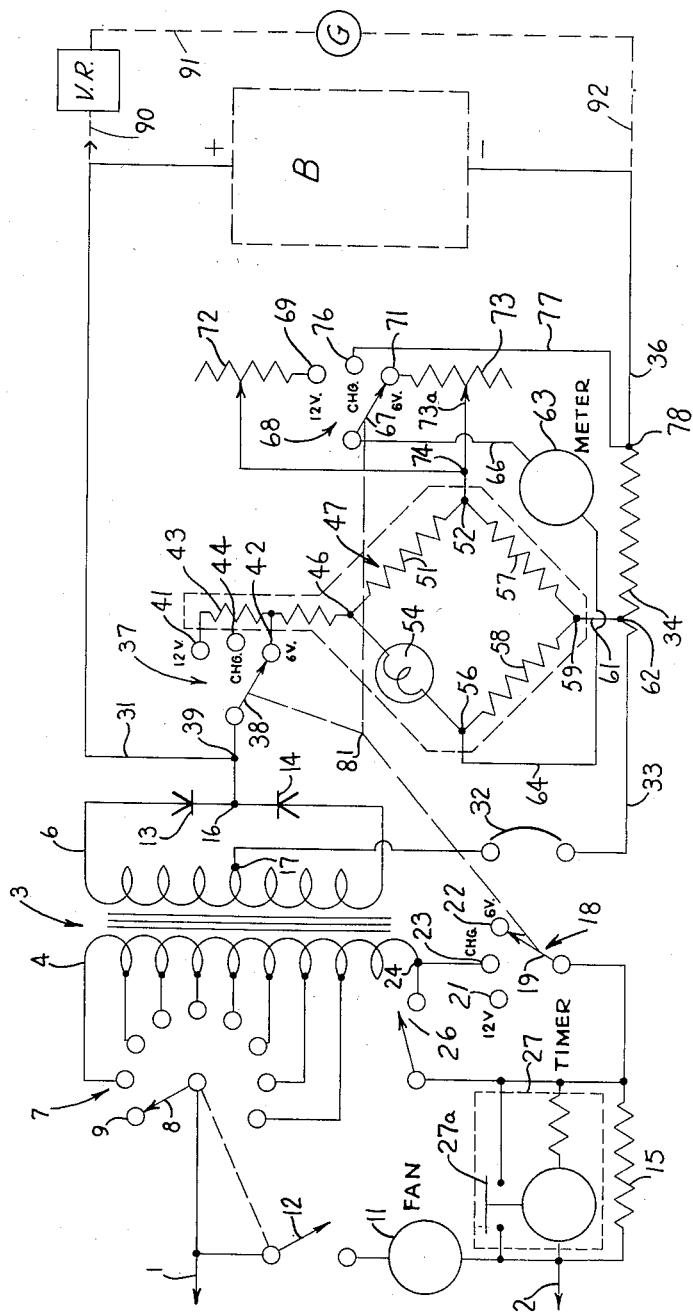
Figure 2 is a circuit diagram illustrating the invention.

In meeting the objects and purposes above outlined, the invention contemplates a substantially conventional battery charger structure associated with a meter and control circuitry, all as shown in Figure 2. The charger supply terminals 1 and 2 are arranged for connection to any convenient source, normally 115 volt A.C. A transformer 3 is provided with a primary winding 4 and a secondary winding 6, said primary winding having a plurality of taps and tap contacts 7 for adjusting the voltage output of the transformer in a conventional manner. A combined selector and switch 8 is arranged for connecting the input conductor 1 either to an "off" terminal 9 or to a selected one of the tap contacts 7. A fan 11 is connected across the input conductors 1 and 2 and is provided with a fan switch 12 in ganged connection with the switch 8 by which the fan is automatically turned on whenever the switch 8 is connected to any of the tap contacts 7. The secondary winding 6 is connected at its respective ends through rectifiers 13 and 14 to a first secondary output terminal 16 and has a central tap constituting a second secondary output terminal 17.

The input conductor 2 is connected through a resistor 15 to a switch 18 whose armature 19 is a part of a triple ganged switch whose other parts are hereinafter described further. The contacts 21 and 22 are blind contacts insofar as switch 18 is concerned but the contact 23 is connected to an end 24 of the primary winding 4. Said end 24 is connected through the normally open switch 26, usually spring biased, back to the side of the resistance 15 adjacent the switch 18. A timer 27 including a timer switch 27a is connected in shunt around the resistance 15.

The normal output of the transformer 3 appears at the output terminals 16 and 17. The terminal 16 is connected through the line 31 to one, as the positive, side of the battery being charged and the terminal 17 is connected, preferably through a conventional circuit breaker 32 to a line 33 and thence through a low value, as 50 millivolt, shunt 34 to the line 36 and thence to the negative side of the battery.

A second switch 37 has its armature 38 connected to a junction 39 in the line 31. The contacts 41 and 42 are connected at spaced points on a resistance 43 and the contact 44 of the switch 37 is blind. The resistance 43 is then connected to a terminal 46 of the bridge circuit 47, which terminal is connected through a resistance 51 to a first bridge output terminal 52 and through a time variable resistance, as a light filament 54, to a second bridge output terminal 56. Said two output terminals 52 and 56 are respectively connected through resistances 57 and 58 to a terminal 59 which latter is connected to the conductor 61 to a junction point 62 at the end of the shunt 34 adjacent the secondary output terminal 17. The resistances 57 and 58 are of equal value with respect to each other and the resistance 51 and the filament 54 in its normal, or cold, condition are equal with respect to each other. However, as the filament 54 is heated by the passage of current therethrough, its resistance will change with respect to the value of the resistance 51, while the values of the resistances 51, 52 and 58 will remain substantially unchanged.

The meter 63 is connected by a conductor 64 to the second bridge output terminal 56 and is further connected by a conductor 66 to the armature 67 of a third ganged switch 68. The terminals 69 and 71 of said switch are connected respectively through variable resistances 72 and 73, for calibration purposes, to the junction 74 and thence to the first bridge output terminal 52. The terminal 76 of the switch 68 is connected by the conductor 77 to the junction point 78 located at the end of the shunt 34 opposite to the junction point 62 and connected to the battery.

As schematically indicated by the broken lines meeting at the point 81, the armatures of the three switches 18, 37 and 68 are ganged together for simultaneous operation, the legends "6 v.," "chg." and "12 v." indicating, respectively, the 6 volt checking position, the charging position and the 12 volt checking position. The car generator is indicated at G in Figure 2 and the voltage regulator and cut-out is collectively indicated at VR, with the broken lines 90, 91 and 92 indicating schematically the circuitry connecting the generator and the voltage regulator serially with the battery.

*Operation*

The operation of the device will be readily understood by those familiar with normal battery charging procedures but will be described in detail for the purpose of insuring a full disclosure.

A supply voltage, such as 115 volts, 60 cycle A.C. potential is applied to the input terminals 1 and 2 and the ganged switch including the armatures 8 and 12 will be moved so that the armature 8 contacts a selected one of the tap contacts 7 and the armature 12 closes the fan switch. This energizes the fan which cools the apparatus in a conventional manner. The timer 27 is set in a conventional manner for a selected period of time after which the timer will actuate the switch 27a and shut off the so-called "fast charge" although a trickle charge through trickle charge resistor 15 will continue. The ganged switches 18, 37 and 68 are moved to contact respectively the contacts 23, 44 and 76. Moving the switch 18 to the contact 23 will energize the primary winding 4 of the transformer 3 which in turn energizes the secondary winding 6 and this acts through the center tap 17 of the secondary winding and the rectifiers 13 and 14 to apply a D.C. voltage to the conductors 31 and 33 and thereby apply a charging voltage to the battery in a known manner.

Figure 1:
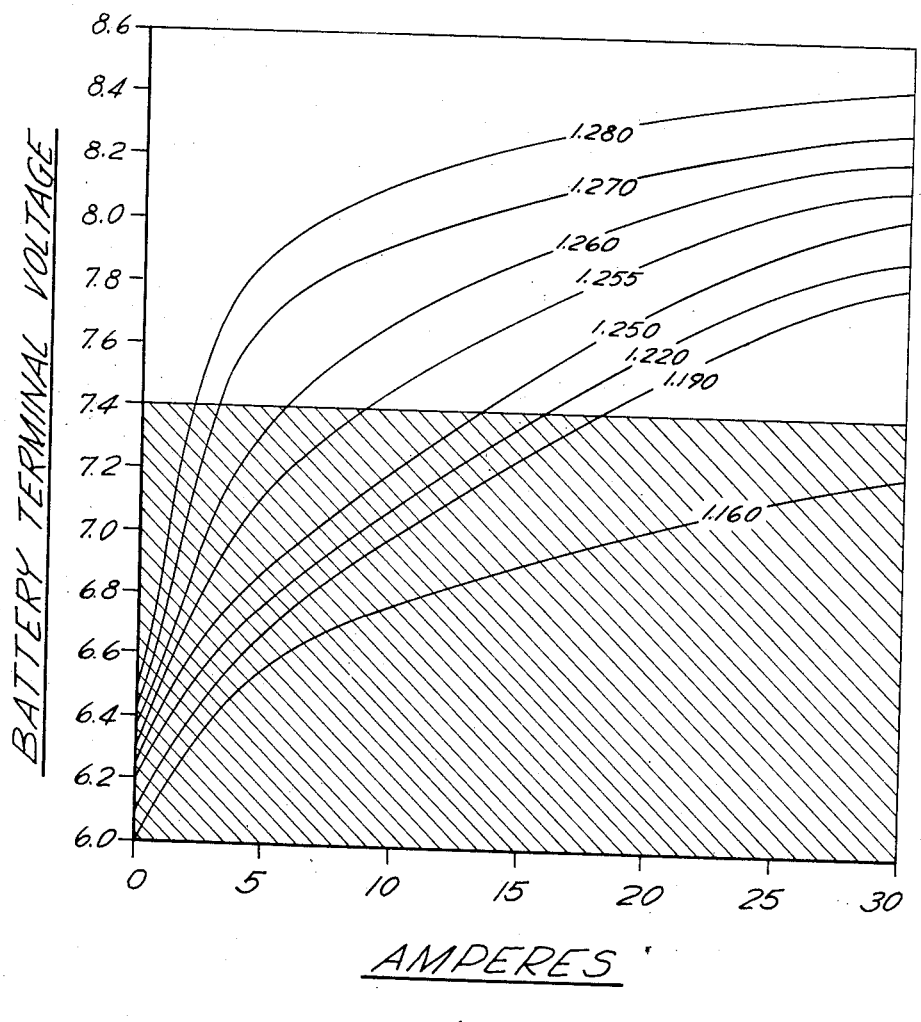
Figure 1 is a conventional chart illustrating the voltage required to be applied showing the charge rates at different voltages and at different states of charge.

Now turning briefly to the graph appearing in Figure 1 it will be seen that the abcissae represent amperes of charging current and the ordinates represent battery terminal voltage. The shaded area extending from the bottom of the graph up to the 7.4 line indicates the normal working area of a 6 volt battery as determined by a typical setting for the voltage regulator. Thus, the unshaded zone above the 7.4 line indicates conditions which might damage the battery and are therefor normally prevented from occurring by the limiting action of the regulator. The heavy lines are known in the industry as "charge voltage curves" and indicate what charge rate a battery in good condition may be expected to accept at various voltages and under different existing conditions of charge. The numerals on each of said charge voltage curves indicate the specific gravity readings corresponding to different states of charge in a given battery. Thus, a battery having a specific gravity of 1.160 will accept a charge up to, and possibly somewhat above, 30 amperes while a battery having a specific gravity reading of 1.190 will accept a charge of not more than about 18 amperes if the voltage regulator is set, as is normal, at 7.4 volts. The curve thus shows that when the battery is in a relatively low state of charge, it will accept a high charge current at a relatively low voltage but as the battery approaches a higher and higher condition of charge a progressively higher voltage must be applied to maintain the same rate of charge but that, since the voltage regulator will limit these relatively higher voltages, the actual charge rate will fall off quite materially. Thus, it becomes apparent that where the charging voltage is limited, the charging rate of the battery will be progressively reduced by the countervoltage of the battery as it comes up to the desired charge level.

Turning now to the rate finding operation, and assuming for the purpose of illustration the charging of a 6 volt battery, the switches 18, 37 and 68 will be turned in the position shown in the drawing, namely, where their respective armatures are contacting the contacts 22, 42 and 71, respectively. This opens the circuit of the primary winding 4 and this deenergizes the charging circuit above described. The rectifiers 13 and 14 will oppose potential from the positive side of the battery B and hence no current will travel through the secondary winding 6 of the transformer. Thus, the counter-voltage of the battery is applied through the switch 37 to the terminal 46 of the bridge circuit, through said bridge circuit to the terminal 59 and thence through the conductor 61, shunt 34 and conductor 36 back to the battery B.

Since the resistances 57 and 58 are equal to each other and the resistance 54 in its cold condition is equal to the resistance 51, when the switch 37 is first moved to close the armature 38 with the contact 42, there will be no potential developed between the terminals 52 and 56 of the bridge circuit. Thus, there will be no movement of the meter 63. As the filament 54 becomes heated by the passage of current therethrough, its effective resistance will change in an amount proportional to the magnitude of the voltage applied thereto and thus the unbalancing of the bridge circuit will be proportional to the voltage applied to the filament 54. This will create a potential difference between the output terminals 52 and 56 and the meter 63 will thereby be actuated accordingly. The slider 73a may be adjusted with respect to the resistance 73 for the purpose of calibrating the meter.

Next, the timer switch 27a will be closed, either manually or by starting the timer as desired in order to apply the source voltage between the armature of the switch 26 and the armature 8 of the primary winding of the transformer. With the voltage so applied, the normally open switch 26 will be depressed, thereby momentarily energizing the primary winding 4 of the transformer 3 and energizing the output terminals 16 and 17 of the charging circuit. The magnitude of the voltage thus appearing between the terminals 16 and 17 will depend upon the setting of the armature 8 with respect to the tap contacts 7. The counter-voltage of the battery will also be applied to the terminals 16 and 17 and thus the voltage between the terminals 39 and 62, that is, the voltage across the circuit of the bridge 47 and the switch 37 will be the difference between the two voltages thus applied in opposition to each other and the meter 63 will read accordingly.

In this way, by closing the switch 26 and adjusting the armature 8 until the meter 63 reads properly according to the particular conditions under which a given battery is being charged, the proper charging rate for the particular battery under its particular then existing conditions can be quickly determined.

With the armature 8 being in a proper position for effecting the proper charging rate as indicated by the meter 63, the switches 18, 37 and 68 are then moved into their respective "charge" positions and the timer 27 is started (or restarted if the starting of the timer was used for closing the switch 27a in the rate finding operation as above mentioned), whereby the switch 27a is closed for a predetermined period of time. The period of time for which the timer is set will vary according to the level of charge already in the battery, but this is well known to the prior art and needs no detailing here. For example, in one specific embodiment of the invention, the timer is set for 55 minutes if the battery is completely uncharged, it is set for 45 minutes if the battery is approximately one-fourth charged and it is set for 30 minutes if the battery is approximately one-half charged.

Moving the switches 18, 37 and 68 into their respective "charge" positions energizes the charging circuit and de-energizes the circuit of the bridge 47 and the charging of the battery proceeds in a normal manner until the timer 27 times out and opens the switch 27a, likewise in a known manner. With the switch 68 moved so that the armature thereof contacts the contact 76, the meter 63 is then placed in shunt connection with respect to the shunt resistance 34. This measures upon a suitable scale on the meter the amperage being supplied to the battery by the charging operation and thereby provides a continuous indication of the charging current.

If at any time during the charging operation it is desired to recheck the correctness of the charging rate, this can be done very quickly by moving the switches 18, 37 and 68 back to their respective "6 v." positions and again depressing the switch 26. The armature 8 can then again be adjusted to correct the charging rate, if needed, after which the switches 18, 37 and 68 are returned to their respective "charge" positions and the charging is resumed.

When the timer 27 times out and terminates the charging operation, the apparatus here described can be used for conducting what is known in the industry as a "regulated volts test" for the purpose of determining whether the vehicle generator, together with the circuitry connecting said generator to the battery, is operating correctly. To do this, the ganged switch is again moved into either its 6 volt or 12 volt position according to the voltage of the system and the vehicle engine started in order to operate the generator. The generator will now assume the same function with respect to the battery and the meter 63 as was assumed by the output potential of the charger in the rate finding operation when the switch 26 was closed. Thus, if the generator is applying a voltage sufficiently greater than the back voltage or countervoltage of the battery to keep the battery properly charged, the meter 63 will so indicate. On the other hand, if the generator is not operating properly or if the voltage regulator and cut-out is not operating properly, then the net voltage impressed across the circuit of the meter 63 will show an incorrect charge rate and further investigation may be made to locate the source of the trouble. Thus, the effectiveness of the charging operation can be readily determined before the battery is disconnected from the charging apparatus.

If, during the rate finding operation, the meter 63 remains at an excessively high indication, even when the armature 8 of the selector switch is in its lowest position, that is, its furthest clockwise (as appearing in Figure 2) position, it may indicate that the battery has become sulphated. Thus, the operator will be warned not to apply the usual rapid charge technique to the battery but rather to apply the normal treatment for a sulphated battery, assuming it can be remedied at all, namely, by charging at a very slow rate for a long period of time, such as 100 hours. Thus, the rate finding operation as described serves to diagnose, and warn the operator of, the existence of a sulphated condition in a battery, to which the operator can then apply the proper treatment. If such a battery were merely connected in the more usual manner to a rapid charging charger, it would be ruined. This remedy for a sulphated battery has long been known, but under the techniques often practiced with conventional service station equipment, the sulphated condition of the battery is often not recognized until it is too late and the battery has been ruined.

In view of the foregoing, it will be appreciated that with the charger (or the generator in the regulated volts test) being referenced directly to the battery itself, the question of adjusting the charging rate according to the temperature of the battery may be ignored. Thus, the same procedure will be followed as above outlined regardless of whether the battery is being charged in a garage on a hot day, as at 80° F., or on a cold day at a low temperature, such as 20° F. This greatly improves both the ease and the accuracy of effecting a battery charging operation.

It will be further appreciated that careful following of the rate finding operation as above outlined will indicate at the commencement of the charging operation whether the battery is capable of receiving a charge and hence it will not be necessary to apply any separate volt meter tests to the battery.

It will be readily recognized that where the charging apparatus is to be used with a 12 volt battery, the procedure will be the same as above described excepting that the switches 18, 37 and 68 will be moved to contact their respective "12 v." positions represented by the contacts 21, 41 and 69, respectively.

The trickle charge resistor 15 is provided around the switch 27a in order to permit the apparatus to function as a trickle charger when desired. Under these circumstances, the rate finding operation can, and preferably will, be utilized in the same manner as set forth above for the rapid charge connection and for the same purposes. Further, at the end of the charging operation, the switches 18, 37 and 68 are desirably moved into the voltage checking positions, either the "6 v." or the "12 v." positions according to the voltage of the battery involved, as above described for the purpose of checking the effectiveness of the vehicle charge systems on the battery before removing the charging apparatus.

Although the above mentioned drawings and description refer to one particular, preferred embodiment of the invention, it is not my intention, implied or otherwise, to eliminate other variations or modifications of the invention unless specifically stated to the contrary in the hereinafter appended claims.

I claim:

1. In a charger for a storage battery having a transformer with its primary winding connectible to a source of alternating potential through voltage selecting means associated with said primary winding and its secondary winding connectible through a rectifier to first and second charging terminals and thence to the battery terminals, the improvement comprising: a shunt resistance of low value arranged in series between the first charging terminal and a battery terminal; voltage sensitive means having a first and second connecting terminals and first and second output terminals, means connecting said first connecting terminal to a point between said shunt resistance and said first charging terminal and means connecting said second connecting terminal to said second charging terminal; said voltage sensitive means creating a voltage between said output terminals in response to, and of magnitude in proportion to, the voltage applied between said connecting terminals; a meter responsive to the flow of current therethrough and means connecting said meter to said output terminals and a meter switch for disconnecting one side of said meter from one of said last named output terminals and connecting it to the side of said shunt resistance remote from said secondary winding; a first switch between said voltage sensitive means and the second of said charging terminals, means connecting said meter switch for movement simultaneously with said first switch; and a second switch simultaneously movable with said first switch and located in series with the primary winding of said transformer, said switches being connected together so that when the second switch is open the first switch is closed and the meter switch connects the meter to the voltage sensitive means, and vice versa, and a further switch connected around said second switch and operable independently thereof.

2. In a charger for a storage battery having a transformer with its primary winding connectible to a source of alternating potential through voltage selecting means associated with said primary winding and its secondary winding connectible through a rectifier to first and second charging terminals and thence to the battery terminals, the improvement comprising: a shunt resistance of low value arranged in series between the first charging terminal and a battery terminal; means including a resistance bridge circuit having first, second, third and fourth terminals with said resistances each arranged between two of said terminals, said bridge circuit being connected at said first terminal to a point between said shunt resistance and said first charging terminal and connected at its third terminal to said second charging terminal; one of said bridge resistances including a high resistance element capable of materially changing its resistance as a result of the application of voltage thereto and proportionally to the magnitude of said voltage; a meter responsive to the flow of current therethrough and means connecting said meter to said second and fourth terminals of said bridge circuit and a meter switch for disconnecting one side of said meter from one of said second and fourth terminals of said bridge circuit and connecting it to the side of said shunt resistance remote from said secondary winding; a first switch between said bridge circuit and the second of said charging terminals, means connecting said meter switch for movement simultaneously with said first switch; and a second switch simultaneously movable with said first switch and located in series with the primary winding of said transformer, said switches being connected together so that when the second switch is open the first switch is closed and the meter switch connects the meter to the bridge circuit, and vice versa, and a further switch connected around said second switch and operable independently thereof.

3. In a charger for a storage battery having a transformer with its primary winding connectible to a source of alternating potential through voltage selecting means associated with said primary winding and its secondary winding connectible through a rectifier to first and second charging terminals and thence to the battery terminals, the improvement comprising: a shunt resistance of low value arranged in series between the first charging terminal and a battery terminal; means including a resistance bridge circuit having first, second, third and fourth terminals with said resistances each arranged between two of said terminals, said bridge circuit being connected at said first terminal to a point between said shunt resistance and said first charging terminal and connected at its third terminal to said second charging terminal; one of said bridge resistances including a high resistance element capable of heating upon application of potential thereto and materially changing its resistance as a result of said heating and proportionally to the magnitude thereof; a meter responsive to the flow of current therethrough and means connecting said meter to the second and fourth terminals of said bridge circuit and a meter switch for disconnecting one side of said meter from one of said second and fourth terminals of said bridge circuit and connecting it to the side of said shunt resistance remote from said secondary winding; a first switch between said bridge circuit and the second of said charging terminals, and a second switch located in series with the primary winding of said transformer, said switches being movable so that when the second switch is open the first switch may be closed and the meter switch may connect the meter to the bridge circuit, and vice versa, and a further switch connected around said second switch and operable independently thereof.

4. In a charger for a storage battery having a transformer with its primary winding connectible to a source of alternating potential through voltage selecting means associated with said primary winding and its secondary winding connectible through a rectifier to first and second charging terminals and thence to the battery terminals, the improvement comprising: a shunt resistance of low value arranged in series between the first charging terminal and a battery terminal; means including a resistance bridge circuit having first, second, third and fourth terminals with resistances each arranged between two of said terminals, said bridge circuit being connected at said first terminal to a point between said shunt resistance and said first charging terminal and connected at its third terminal to said second charging terminal; one of said bridge resistances including a high resistance element capable of heating upon application of potential thereto and materially changing its resistance as a result of said heating and proportionally to the magnitude thereof; a meter responsive to the flow of current therethrough and means connecting said meter to second and fourth terminals of said bridge circuit and a meter switch for disconnecting one side of said meter from one of said second and fourth terminals of said bridge circuit and connecting it to the side of said shunt resistance remote from said secondary winding; a first switch between said bridge circuit and the second of said charging terminals, means connecting said meter switch for movement simultaneously with said first switch; and a second switch simultaneously movable with said first switch and located in series with the primary winding of said transformer, said switches being connected together so that when the second switch is open the first switch is closed and the meter switch connects the meter to the bridge circuit, and vice versa, and a further switch connected around said second switch and operable independently thereof.

5. In a charger for a storage battery having a transformer with its primary winding connectible to a source of alternating potential through voltage selecting means associated with said primary winding and its secondary winding connectible through a rectifier to first and second charging terminals and thence to the battery terminals, the improvement comprising: a shunt resistance arranged in series between the first charging terminal and a battery terminal; voltage sensitive means having first and second connecting terminals and first and second output terminals; means connecting said first connecting terminal to a point between said shunt resistance and said first charging terminal; means, including first switch means, connecting said second connecting terminal to said second charging terminal, said first switch means including an armature movable into contact with three different contacts, one of said contacts being dead and the other contacts being connected to said second connecting terminal by resistances of different value; said voltage sensitive means creating a voltage between said output terminals in response to, and of magnitude in proportions to, the voltage applied between said connecting terminals; a meter and means connecting said meter to said output terminals of said voltage sensitive means; second switch means including an armature movable into contact with three different contacts, one of said contacts being connected to the side of said shunt resistance remote from said first charging terminal, the other two contacts being connected to said one output terminal of said voltage sensitive means through resistances of different value and means for adjusting the values of said last-named resistances whereby said charger may be connected for determining the appropriate charging rate for, and for charging, either a six volt or a twelve volt battery.

References Cited in the file of this patent

UNITED STATES PATENTS 2,432,068    Pugh _____ Dec. 2, 1947